United States Patent [19]

Payne et al.

[11] 4,284,521

[45] Aug. 18, 1981

[54] REDUCED ALKALINE EARTH METAL POWDERS AND PROCESS FOR PRODUCING SAME

[75] Inventors: David A. Payne, Champaign; Sang M. Park, Urbana, both of Ill.; Otto C. Jahnke, El Cajon, Calif.

[73] Assignee: Ferro Corporation, Cleveland, Ohio

[21] Appl. No.: 171,301

[22] Filed: Jul. 23, 1980

Related U.S. Application Data

[63] Continuation-in-part of Ser. No. 23,722, Mar. 26, 1979, abandoned.

[51] Int. Cl.³ .................... C04B 35/46; H01B 1/06
[52] U.S. Cl. ...................... 252/62.3 BT; 106/73.3; 252/520; 252/521
[58] Field of Search ............... 252/62.3 BT, 63.5, 520, 252/521; 106/73.3

[56] References Cited

U.S. PATENT DOCUMENTS

| | | | |
|---|---|---|---|
| 3,933,668 | 1/1976 | Takahashi et al. | 106/73.3 |
| 4,014,822 | 3/1977 | Fujikawa | 252/520 |
| 4,022,716 | 5/1977 | Ueoka et al. | 252/62.3 BT X |
| 4,096,098 | 6/1978 | Umeya et al. | 252/62.3 BT |
| 4,143,207 | 3/1979 | Itakura et al. | 252/520 |

*Primary Examiner*—Jack Cooper
*Attorney, Agent, or Firm*—Shlesinger, Fitzsimmons & Shlesinger

[57] ABSTRACT

An improved polycrystalline semiconducting ceramic composition can be produced from a novel powder which comprises a reduced alkaline earth metal titanate doped with a hexavalent metal oxide such as $(MO_3)(Bi_2O_3)_x$ where M is tungsten or molybdenum, and x ranges from 0 to 7. This powder, which has a mean particle size on the order of less than 10 microns, may be liquid phase sintered with lead germanate to produce a ceramic composition having an extremely fine grain size. By reducing the earth metal titanate (either chemically or gaseously) prior to the liquid phase sintering with lead germanate, particle or grain size growth is substantially eliminated, and the grain size of the ceramic composition is similar to the original particle size of the earth metal titanate.

9 Claims, 1 Drawing Figure

REDUCED ALKALINE EARTH METAL POWDERS AND PROCESS FOR PRODUCING SAME

This is a continuation-in-part of our pending application Ser. No. 23,722, filed Mar. 26, 1979, now abandoned This invention relates to polycrystalline semiconducting powders for producing ceramic compositions having internal insulated grain boundaries, and to methods for producing such powders.

Ceramic compositions having internal insulated grain boundaries are known in the art. For example compositions based on barium titanate having a perovskite lattice doped with $Sb_2O_3$ to provide n-type conductivity and with CuO to provide p-type conductivity are disclosed in Brauer, et al., U.S. Pat. No. 3,569,802, which patent is incorporated herein by reference as illustrative of the state of the art. Such compositions have grain sizes in the range of about 20-300 microns and have a high dielectric constant value; however, because they are based on a ferroelectric material, they exhibit the usual Curie-Weiss temperature dependence with as high as ±80% change in capacitance over a temperature range of −30 to 85° C., and a saturation of dielectric constant with voltage.

A somewhat more stable polycrystalline semiconducting ceramic composition can be produced by sintering strontium titanate with a small amount of $Nb_2O_5$ or $Ta_2O_5$ and a small amount of $GeO_2$ or ZnO. The internal grain boundaries are insulated by diffusing therein $Bi_2O_3$ or a mixture of $Bi_2O_3$ PbO, and $B_2O_3$ from the surface of a pellet. Such compositions are disclosed in Takahasi et al., U.S. Pat. No. 3,933,668 which patent is incorporated herein by reference as illustrative of the art relating to strontium titanate ceramics. These compositions typically exhibit high dielectric constant values, temperature coefficients of capacitance in the neighborhood of ±15%, and grain sizes greater than 25 microns.

Although the above-described semiconducting ceramic compositions having internal insulating boundaries provide high dielectric constant value, they are limited in their application because of their relatively high temperature and voltage coefficients of capacitance, and their large grain sizes; further, they cannot be successfully fabricated into thin layer, multi-layer devices.

Accordingly, it is an object of this invention to provide novel polycrystalline semiconducting powders for producing improved ceramic compositions having internal insulated grain boundaries that exhibit high dielectric constant values, low dissipation factors, and low temperature and voltage coefficients of capacitance.

Another object of this invention is to provide reduced earth metal titanate powders which are particularly suited for producing fine-grained ceramics suitable for the fabrication of thin-layer capacitors.

A further object of this invention is to provide a process for producing semi-conducting earth titanate powders which can be liquid phase sintered with lead germanate at temperatures well below those previously required to produce ceramic compositions of the type described.

BRIEF DESCRIPTION OF THE DRAWING

The FIG. is a phase diagram of the $PbO-GeO_2$ system showing the melting points of various lead germanate compositions.

SUMMARY OF THE INVENTION

Figure 1:
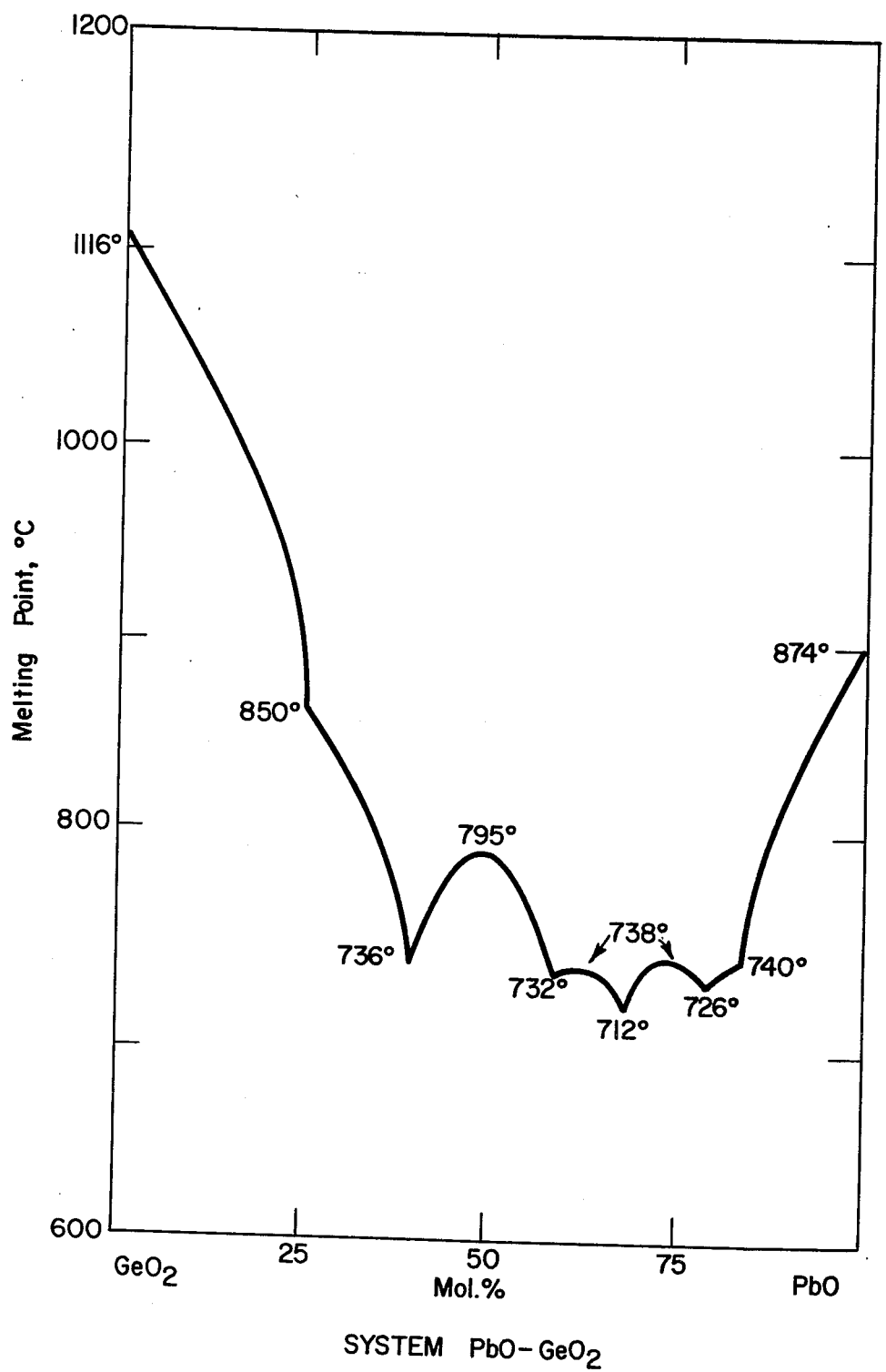

The reduced powder made in accordance with this invention comprises a polycrystalline alkaline earth metal titanate doped with a small amount of metal oxide capable of providing n-type semiconductivity. When liquid phase sintered with a minor amount of lead germanate composition this powder produces a very desirable semiconducting ceramic composition for use in making thin-layered, multilayer ceramic capacitors. The term "lead germanate" in this specification is meant to include lead and germanium containing compounds such as $Pb_5Ge_3O_{11}$, and lead, germanium, and silicon containing compounds defined by the formula $$(PbO)_x(GeO_2)_{y-z}(SiO_2)_z$$

where x ranges from 1 to 6, y ranges from 1 to 3, and z ranges from 0.0 to 0.75y. Mixtures of two or more compositions can also be used.

The ceramic compositions are characterized in that the lead germanate composition is incorporated therein by liquid phase sintering which provides an insulating boundary layer about the grains of the polycrystalline semiconducting alkaline earth metal titanate.

Suitable alkaline earth metal titanates possess a perovskite lattice structure and comprise fine particles of strontium titanate, barium titanate, calcium titanate, and mixtures thereof, which have mean particle sizes on the order of less than 10 microns, and suitably 2 microns or less. Strontium titanate is the preferred material and can be obtained from mixtures of SrO and $TiO_2$, $SrCO_3$ and $TiO_2$, and from other sources well known in the art.

The metal oxide providing n-type semiconductivity is suitably a metal oxide dopant having the formula $$(MO_3)(Bi_2O_3)_x$$

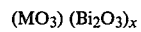

where M is tungsten (W) or molybdenum (Mo), and x ranges from 0 to 7. Materials that afford $WO_3$ or $MoO_3$ during calcination can be used to advantage; examples of such materials are the acids $H_2WO_4$ and $H_2MoO_4$ and salts thereof.

Lead germanate compositions suitable for liquid phase sintering with the powders of this invention can be prepared by heating various mixtures of PbO and $GeO_2$ up to temperatures of about 1000° C. The phase diagram in the drawing shows the melting points for various molar ratios of PbO and $GeO_2$. For the purpose of this invention, lead germanate compositions having melting points below about 850° C. are preferred. Because of the relatively high cost of $GeO_2$ a portion of it can be replaced advantageously with $SiO_2$.

The lead germanate composition having the formula $Pb_5Ge_3O_{11}$ is a preferred composition because it melts congruently (i.e., solid and liquid phases have identical compositions) to provide a low viscosity melt which permits rapid and complete liquid phase sintering at temperatures as low as 850° C. The composition is prepared by heating a mixture of 5 moles of PbO and 3 moles of $GeO_2$ in platinum crucible at 800° C. The cooled product, having the formula $Pb_5Ge_3O_{11}$, is crushed and powdered in a mortar and pestle, screened through a 325 mesh screen, and further reduced by ball milling. The final powder has a particle size ranging between about 0.5 and 30 microns with the greatest concentration at about 5 microns.

DESCRIPTION OF THE PREFERRED EMBODIMENTS

The novel powder used for ceramic compositions of this invention is produced by calcining fine particle size (less than 10 micron) alkaline earth metal titanate, or a mixture of alkaline earth oxide or carbonate with $TiO_2$, with a small amount of the metal oxide dopant disclosed above to produce n-type semiconductivity. This calcining operation is accompanied by a reduction of the strontium titanate, which causes the color of the titanate to change generally from white to black. This reduction can be effected either chemically by aliovalent doping, or gaseously by firing the strontium titanate and the metal oxide dopant in the presence of, for example, $H_2$. The ceramic composition is then produced by milling and blending the reduced powder and the lead germanate composition disclosed above; and by pressing and firing the mixture in air or a reducing atmosphere to produce internal insulating boundary layers about the grains of the semiconducting titanate by liquid phase sintering.

Generally from about 90 to about 99, and preferably from about 95 to about 98% by weight of the alkaline earth metal titanate is calcined with generally from about 1.0 to about 10%, and preferably from about 2 to about 5% by weight of the metal oxide dopant in air or a reducing atmosphere to produce n-type semiconductivity. It is possible to effect chemical reduction of the strontium titanate in air during the calcining operation, but it is difficult and requires a highly pure titanate and precise dopant levels. When fired in a reducing atmosphere (with $H_2$ present for example) these levels need not be precisely maintained to effect the required reduction.

Calcination is therefore conveniently carried out at a temperature of about 1000° to 1400° C. for about 1 to about 4 hours, and preferably in a weakly reducing atmosphere, for example a forming gas containing about 10% of hydrogen. Since a slight sintering may occur during calcining, the resulting powder may be carefully milled to avoid contamination and to maintain a mean particle size of less than 10 microns. When this reduced powder is used to produce the above-noted ceramic composition, it is blended with generally from about 0.01 to about 35, preferably from about 1 to about 10% by weight of the lead germanate composition, and is then pressed and fired to provide, by liquid phase sintering, internal insulating boundary layers about the grains of the metal titanate. The liquid phase sintering step is conveniently carried out at a temperature in the range of from about 850° to about 1300° C. for from about 1 to about 60 minutes. Since the earth metal titanate has already been reduced, this operation may be conducted in air or a weakly reducing atmosphere. A fine-grained micro-structure exhibiting a grain size of about 2 microns can be obtained which is highly suited to the production of thin-layer, multi-layer capacitors having excellent dielectric properties.

The invention is further illustrated by reference to the following procedures and examples.

EXAMPLE 1

Fine particle size strontium titanate (1 micron) was reduced by calcining with 2% by weight of $WO_3$ in a 10% hydrogen atmosphere at 1380° C. for 4 hours to produce an n-type semiconductor. To the resulting powder was added 5% by weight of $Pb_5GeO_3O_{11}$, the mixture was milled and blended, and then pressed into discs (1 cm in diameter, 0.5 mm thick) and fired at 1200° C. for 30 minutes to produce internal insulating boundary layers about the strontium titanate grains by liquid phase sintering. The discs were electroded with fritted silver paste and fired in air at 800° C. for 5 minutes.

Dielectric constant (K) and dissipation factor (DF) were recorded at 100 KHz and 0.5 volts AC. The voltage coefficient of capacitance (VC) was measured at 200 volts DC. The temperature coefficient of capacitance (TC) was measured over the temperature range of −55° to +125° C.

Typical values found for the capacitors prepared in this example were: K=5,000–10,000; DF=3% max.; VC=−5% max.; TC=±5% max.

EXAMPLE 2

Fine particle size strontium titanate (1 micron) was reduced by calcining with 2% by weight of $Bi_2WO_6$ in a 10% hydrogen atmosphere at 1200° C. for 2 hours to produce an n-type semiconductor. To the resulting powder was added 5% by weight of $Pb_5Ge_3O_{11}$, the mixture was milled and blended, and then pressed into discs (1 cm in diameter, 0.5 mm thick) and fired at 1200° C. for 30 minutes to produce internal insulating boundary layers by liquid phase sintering. The discs were electroded with fritted silver paste and fired in air at 800° C. for 5 minutes.

Typically values found for capacitors prepared in this example were: K=5,000–10,000; DF=3% max.; VC=−5% max.; TC=±5% max.

It is possible to produce a reduced strontium titanate "powder" at the above-noted calcining temperatures, as distinguished from a sintered product, because at these calcining temperatures the metal oxides melt to form a reactive liquid which chemically dopes or reduces (substitutes into) the $SrTiO_3$. As noted above, however, the firing in a reducing atmosphere enables the reduction to occur within a very wide range of dopant levels (1.01 to about 10) as contrasted with the very narrow range required to effect satisfactory chemical reduction.

It is clear that a stabilized, extremely fine grained high dielectric constant ceramic composition having internal insulated boundary layers can be produced from the herein disclosed reduced strontium titanate powders by liquid phase sintering operation with the herein disclosed lead germanate composition. Because the strontium titanate powder is reduced prior to sintering with the lead germanate, the resultant ceramic composition has substantially no appreciable grain growth and thus has a grain size approximately the mean particle size of the reduced earth metal titanate from which it is produced. This contrasts with prior art compositions in which the earth metal titanate powders are not reduced, prior to mixing and sintering, with metal oxide capable of providing semiconductivity characteristics. These prior processes uniformly result in an undesirable grain growth of the composition during the sintering operation, thus producing a product the grain size of which is too large to produce satisfactory, thin-layered capacitors. The electrical properties of the capacitors fabricated from the herein disclosed ceramic compositions, such as dielectric constant, dissipation factor, voltage and temperature coefficients of capacitance, appear exceedingly attractive for various applications including high capacitance, low voltage markets and thin-layer, multi-layer devices.

Although this invention has been disclosed with particular reference to certain preferred embodiments thereof, it is understood that variation and modifications can be effected within the spirit and scope of the appended claims. It is intended that all matter contained in the above description or shown in the accompanying drawings shall be interpreted in an illustrative and not in a limiting sense.

What is claimed is:

1. A reduced alkaline earth metal titanate powder having a mean particle size of less than 10 microns, and a perovskite lattice structure doped with a metal oxide having the formula $$(MO_3)(Bi_2O_3)_x$$

where M is tungsten or molybdenum, and x ranges from 0 to 7, the doping being in an amount sufficient to provide n-type semiconductivity, said powder being produced by calcining a mixture of materials which, as a result of said calcining operation, yields said reduced alkaline earth metal titanate powder.

2. The powder of claim 1 wherein the alkaline earth metal titanate powder comprises strontium titanate derived from a mixture of $SrCO_3$ and $TiO_2$.

3. The powder to claim 1 wherein the alkaline earth metal titanate powder comprises strontium titanate and the metal oxide is selected from the group consisting of $WO_3$ and $Bi_2WO_6$.

4. A reduced alkaline earth metal titanate powder having a mean particle size of less than 10 microns for use in the manufacture of ceramic capacitors, said powder being produced by calcining alkaline earth metal titanate particles, which have a mean particle size of less than 10 microns or a mixture of alkaline earth oxide or carbonate particles and $TiO_2$, at a temperature of about 1000°–1400° C. for a period of about 1 to 4 hours, and in an amount of from about 90 to 99% by weight, with a metal oxide doping agent in an amount of from about 1.0 to 10% by weight, said metal oxide doping agent having the formula $$(MO_3)(Bi_2O_3)_x$$

where M is tungsten or molybdenum and x ranges from 0 to 7, and whereby the calcined particles exhibit n-type semiconductivity.

5. An alkaline earth metal powder as defined in claim 4, wherein said particles are calcined in a reducing atmosphere and change generally from white to black.

6. An alkaline earth metal powder as defined in claim 4, wherein said calcined particles comprise strontium titanate doped with a metal oxide doping agent selected from the group consisting of $WO_3$ and $Bi_2WO_6$.

7. A process for producing a reduced earth metal titanate powder having a mean particle size of less than 10 microns, and the particles of which exhibit n-type semiconductivity, comprising mixing a quantity of alkaline earth metal titanate particles having a mean particle size of less than 10 microns, or alkaline earth oxide or carbonate particles and $TiO_2$, in an amount of from about 90 to 99% by weight, with a metal oxide doping agent in an amount from about 1.0 to 10% by weight, said metal oxide doping agent having the formula $$(MO_3)(Bi_2O_3)_x$$

where M is tungsten (W) or molybdenum (Mo), and x ranges from 0 to 7, and calcining the mixture for a period of from 1 to 4 hours and in a temperature range of from 1000° C. to 1400° C., thereby to cause said titanate powder to exhibit said n-type conductivity.

8. A process as defined in claim 7, wherein said alkaline earth metal particles comprise strontium titanate and said metal oxide is selected from the group consisting of $WO_3$ and $Bi_2O_6$.

9. A process as defined in claim 7, wherein said calcining takes place in the presence of a reducing atmosphere.

* * * * *